March 27, 1973     P. T. BOURKE     3,723,233

MARBLE FACED WALL PANELS AND METHOD OF MAKING SAME

Original Filed Feb. 19, 1968

Inventor

PATRICK T. BOURKE

By Young + Thompson

Attorneys

United States Patent Office 3,723,233
Patented Mar. 27, 1973

3,723,233
MARBLE FACED WALL PANELS AND METHOD
OF MAKING SAME
Patrick Terence Bourke, Doon House, Maam,
Galway, Ireland
Continuation of abandoned application Ser. No. 706,719,
Feb. 19, 1968. This application July 15, 1971, Ser.
No. 163,070
Int. Cl. B32b 3/12
U.S. Cl. 161—68                           2 Claims

ABSTRACT OF THE DISCLOSURE

The invention provides surface elements such as tiles or panels consisting of a thin lamina of marble bonded to a backing consisting of a metal sheet of honeycomb or cellular structure of substantially greater thickness than said lamina which at least on the side remote from the marble lamina has a skin of tenacious sheet material bonded thereto. The resultant composite element is extremely rigid, light and cheap to produce in comparison with solid marble and may be cut into any desired shape and used as a substitute for solid marble, but with the advantages of lightness, strength and low cost thus enabling such surface elements to be used for many purposes where the use of solid marble would be economically or practicably prohibitive.

---

This is a continuation of application Ser. No. 706,719, filed Feb. 19, 1968 and now abandoned.

BACKGROUND OF THE INVENTION

This invention concerns improvements in the manufacture and construction of tiles, panels and other elements having a marble facing. Such elements are intended for use, for example, in the cladding of walls, ceilings or other surfaces, in the manufacture of furniture, and in fact for all purposes where marble surfaces are required.

Marble is an exquisite surfacing material on account of its hardness and durability, beauty of structure and the high polish which can usually be imparted to it, but its use is greatly restricted by reason of its weight and expense, since the material is liable to fracture if not of a certain thickness, depending upon the handling and usage to which it may require to be subjected. The object of the invention is to materially overcome the drawbacks referred to and thereby enable the use of marble as a surfacing material to be greatly extended and made commercial viable.

SUMMARY OF THE INVENTION

According to the invention a tile, panel or other element consists of a marble lamina or veneer to one side of which is affixed by adhesive a backing comprising a metal sheet of honeycomb or cellular structure (hereinafter referred to as the "filler"), which is of substantial thickness and is bonded to, and thereby reinforced by, one or more relatively thin sheets of material having substantially greater tensile strength (hereinafter termed the "skin"). Thus the filler which is very light in weight, but highly resistant to compression, at least in the direction perpendicular to the surface of the sheet, is reinforced by the more highly tensile skin, and the resultant composite backing has remarkable qualities of lightness, strength and rigidity, so that when bonded to a marble veneer a novel consrtuction sheet material of great utility is provided. The metal employed in carrying out the invention ils.preferably aluminium or a light metal alloy.

The sheets of metal which are employed as a filler in carrying out the invention are commercially available in various thicknesses, and they present a honeycomb-like or cellular structure, the cell walls being perpendicular to the general plane of the material. The cells are closed at least one one side by a skin which consists of a relatively thin sheet of tough material having good tensile qualities, such as glass fiber or sheet aluminium which is firmly bonded to the cellular metal sheet, and together they afford a firm support or backing which is firmly attached to the marble lamina by a suitable adhesive. The adhesive used for this purpose is preferably an epoxy resin, which becomes rock-hard on setting, if necessary under moderate heat treatment. A polyester resin may also be suitable for this purpose. If the filler material is closed on one side only by a skin, the marble lamina is attached upon the opposite side.

DESCRIPTION OF THE DRAWINGS

The invention is hereinafter further described with reference to the accompanying drawings, wherein.

DESCRIPTION OF THE PREFERRED EMBODIMENTS

In preparing marble laminae for use in carrying out the invention, the marble which is quarried in the usual way and cut nto slabs is sawn into laminae, for example by the aid of a diamond-toothed band saw or a circular saw, the laminae being from 2 to 5 mm. in thickness.

Figure 1:
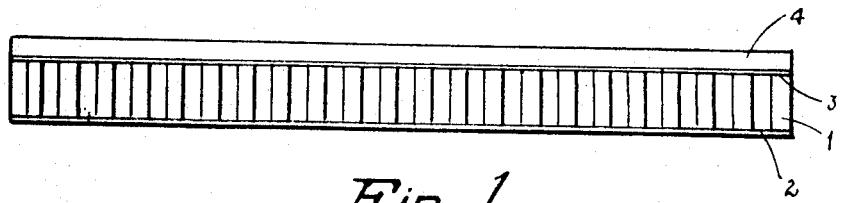
FIGS. 1 and 2 show one example of slab construction according to the invention, FIG. 1 representing a side elevation and FIG. 2 representing a plan partly of FIG. 1, parts being broken away.
Figure 2:
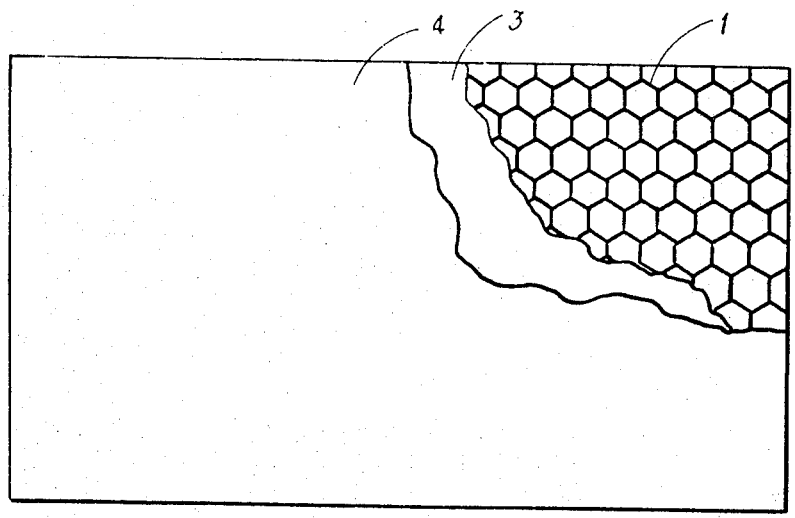

A backing is prepared, which in the example shown in FIGS. 1 and 2 consists of a honeycomb structure of aluminium (so-called "expended aluminium") produced in the form of a sheet 1, advantageously about 12 mm. in thickness, the cells open at each end and the cell walls extending perpendicularly to the general plane of the sheet. This material is commercially available. The metal filler sheet 1 is faced on both sides with a thin sheet of glass fiber 2, 3, a firm bond between the metal sheet 1 (referred to as the filler), and the glass fibre skins 2, 3, being effected by a suitable adhesive, for example, an epoxy resin or polyester resin. The backing thus prepared is laid horizontally on a flat surface, its upper surface coated with adhesive, and a marble lamina 4, prepared as described above is laid thereon. The thin marble lamina is relatively fragile before being applied to the backing, but it may be handled in known manner by the aid of suction pads applied to the oppisite surface to that do which the backing is to be attached.

If desired a light pressure may be applied to the upper surface of the composite sheets while the adhesive is setting, and it may also be desirable to pass the sheets through an oven or moderately heated tunnel if the adhesive employed is one which will harden more quickly or firmly in a warm atmosphere. When the adhesive has set the resulting marble-faced panel will be found remarkably strong and light, but in other respects may be treated as if it consisted of solid marble. The surface may be polished as desired and the panel sawn into pieces of any desired size and superficial shape.

In a modified procedure according to the invention the backing consisting of the sheets 1, 2 and 3 secured together by adhesive as above described, instead of having a previously prepared marble lamina 4 applied thereto, may be secured by adhesive to the surface of a marble slab from which the lamina of marble is to be sawn off, after which the lamina may be cut from the slab and a panel similar in all respects to that described above with reference to FIGS. 1 and 2 is thus obtained. As the backing 1, 2, 3 thus supports the lamina 4 while the latter is being sawn from the crude slab, the risk of cracking the lamina is greatly reduced and remarkably thin marble laminae may be obtained.

It has been found that for the backing a filler of expanded aluminium between 1 and 2 cms. in overall thickness and having a glass-fiber skin on both sides of the order of 0.5 mm. thick, is ample for most purposes, for example if tiles or panels for wall cladding are required. The glass fiber sheet 3 although generally preferred is not always essential, but may be dispensed with in appropriate cases.

The panels have the further advantage that in mounting the panels upon a wall surface they may in general be sufficiently secured by adhesive and it is not usually necessary to drill the panels to receive screws or other fastening means, such as would be practically essential if the panels were of solid marble. They may also be mounted in any known or convenient manner in metal frames or the like and the frames attached to the wall.

The composite panels produced according to the invention are only a fraction of the weight of a corresponding solid marble panels having similar qualities of rigidity and strength when subjected to impact or bending stresses. Consequently, they may fine use in many circumstances where solid marble panels would be unsuitable or uneconomical under present day commercial conditions.

I claim:

1. A method of manufacturing a marble-faced composite surface element comprising a marble lamina bonded by adhesive to a backing comprising a metal sheet of honeycomb or cellular structure of substantially greater thickness than said lamina and having a skin of tenacious sheet material of substantially less thickness than said lamina bonded to the backing on the side thereof remote from said lamina, comprising the steps of adhesively bonding to the surface of a marble slab a metal sheet of honeycomb or cellular structure reinforced by a skin of tenacious sheet material bonded to the side of said sheet remote from said marble slab, and thereafter sawing off a portion of said marble slab to leave a thin marble layer adhered to said metal sheet.

2. A marble-faced composite wall panel comprising a marble lamina 2 to 5 millimeters in thickness and bonded by adhesive to a backing consisting of a sheet of metal honeycomb structure 1 to 2 centimeters thick having a glass fiber skin on the side of said honeycomb opposite said marble lamina about 0.5 millimeter thick, the cell walls of said honeycomb being perpendicular to the plane of the sheet.

References Cited
UNITED STATES PATENTS

| | | | |
|---|---|---|---|
| 2,823,460 | 2/1958 | Weiler | 33—174 |
| 2,911,076 | 11/1959 | Saunders et al. | 161—68 X |
| 3,055,148 | 9/1962 | Christy | 52—309 |
| 3,079,209 | 2/1963 | Boggus | 161—168 X |
| 3,131,514 | 5/1964 | Siek | 52—315 |
| 3,211,253 | 10/1965 | Gonzalez | 181—33 |
| 3,240,855 | 3/1966 | Voelker | 156—254 X |
| 3,301,732 | 1/1967 | Kunz | 156—304 |
| 3,425,889 | 2/1969 | Willits, Jr. | 161—43 |
| 3,458,193 | 7/1969 | Rockwood et al. | 273—6 |
| 3,502,539 | 3/1970 | Mac Phail, Sr. | 161—160 |

OTHER REFERENCES

"Insulation Becomes Load—Bearing" an article on page 265 of the "Architectural Record" April 1956, volume 119, No. 4.

"Epoxy Plastics in Architecture," by Guy G. Rothenstein, pages 138 to 141 an article in "Progressive Architecture," August 1959, volume XL, No. 8.

ROBERT F. BURNETT, Primary Examiner

H. F. EPSTEIN, Assistant Examiner

U.S. Cl. X.R.

52—612, 618; 125—1; 156—254, 267; 161—93, 185